US006339433B1

(12) United States Patent
Politis et al.

(10) Patent No.: US 6,339,433 B1
(45) Date of Patent: *Jan. 15, 2002

(54) CREATING A BLEND OF COLOR AND OPACITY BETWEEN ARBITRARY EDGES

(75) Inventors: George Politis; Timothy Merrick Long, both of New South Wales (AU)

(73) Assignees: Canon Kabushiki Kaisha, Tokyo (JP); Canon Information Systems Research Australia PTY LTD, New South Wales (AU)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/527,806

(22) Filed: Sep. 13, 1995

(30) Foreign Application Priority Data

Sep. 13, 1994 (AU) ............................................. PM8109
Jun. 20, 1995 (AU) ............................................. PN3686

(51) Int. Cl.[7] ................................................. G09G 5/00
(52) U.S. Cl. ....................... 345/646; 345/629; 345/581; 345/606
(58) Field of Search ................................. 395/131, 132, 395/133, 126–130, 135; 345/426–435, 581, 619, 646, 606

(56) References Cited

U.S. PATENT DOCUMENTS 5,339,387 A * 8/1994 Frankel ...................... 395/131
5,598,182 A * 1/1997 Berend et al. .............. 345/133

FOREIGN PATENT DOCUMENTS

WO       WO92-21096       11/1992

OTHER PUBLICATIONS

James D. Foley, et al., Computer Graphics Principles and Practice, Second Edition, 1990, pp. 471–531.

* cited by examiner

Primary Examiner—Mark Zimmerman
Assistant Examiner—Philip H. Stevenson
(74) Attorney, Agent, or Firm—Fitzpatrick, Cella, Harper & Scinto

(57) ABSTRACT

A method and apparatus for creating a blend from one arbitrary edge (20) to a second arbitrary edge (21) in a computer graphic image creation is disclosed. A color along each of the edges (20,21) is determined. A parametric equation is then formed for a color of each pixel (23) within the area bounded by the edges (20,21), and the parametric equation is solved to derive a color for each of the pixels (23). In another aspect, after determining the color along each edge (20,21), each of the edges (20,21) is vectorised into corresponding line segments (31 to 34). Pairs of the line segments (31 to 34) are then matched to form polygons (29) having a defined color at each of vertices, A color is then determined for each pixel of the polygon (29) from the defined colors of the vertices.

73 Claims, 14 Drawing Sheets

CREATING A BLEND OF COLOR AND OPACITY BETWEEN ARBITRARY EDGES

FIELD OF THE INVENTION

The present invention relates generally to the provision of "blends" from a first data value to a second data value and, in particular, to methods and apparatuses for the creation of complex blends within images in computer graphic imaging systems.

BACKGROUND ART

In modern computer graphic imaging systems, it is often necessary to create blends of color or opacity. The color or opacity data at a first data point takes on a first value and at a second data point takes on a second value, with the data points between the first data value and the second data value having an aesthetically pleasing monotonically increasing or decreasing series between the first data value and second data value.

With the increasing levels of computer power available to the general public in the form of desk top workstations and personal computers, there has come an increasing level of complexity in the application programs available for the creation of complex computer graphical images. Hence, products such as Adobe's Photo shop and Illustrator (trade mark) and Quark's Express (trade mark), allow, through a process of interactive editing, the creation of complex images. These images can be of great complexity and can comprise a number of overlapping layers with differing layers possibly having various degrees of transparency.

With the need to create complex and striking images, there is also the need to create such images rapidly and inexpensively. Further, there is a general need to be able to create complex computer graphical objects having slowly varying blends of an extremely complex nature.

SUMMARY OF THE INVENTION

It is an object of the present invention to provide a method and apparatus for the creation of complex blends of data.

In accordance with a first aspect of the present invention, there is provided a method of creating a blend from one arbitrary edge to a second arbitrary edge in a computer graphic image creation system, the method comprising the steps of:

determining a color along each of the edges;
 forming a parametric equation for a color of each pixel within the area bounded by the edges; and
 solving the parametric equation to derive a color for each of the pixels.

In accordance with a second aspect of the present invention, there is provided a method of creating a blend from a first arbitrary edge to a second arbitrary edge in a computer graphic image creation system, the method comprising the steps of:

determining a color along each of the edges;
 vectorising each of the edges into corresponding line segments;
 matching pairs of the line segments from each of the edges so as to form polygons having a defined color at their vertices; and
 determining a color for each pixel of the polygon from the defined color of the vertices.

Preferably, the matching step further comprises matching pairs of line segments in accordance with their relative distance along each of the edges. Alternatively, the matching step further comprises matching pairs of line segments in accordance with their parametric distance along each of the edges.

In accordance with a third aspect of the present invention there is provided an apparatus for creating a blend from one arbitrary edge to a second arbitrary edge in a computer graphic image creation system, the apparatus comprising:

edge color determination means for determining a color along each of the edges;
 parametric determination means for forming a parametric equation for a color of each pixel within the area bounded by the edges coupled to the edge determination means; and
 pixel color deriving means for solving the parametric equation to derive a color for each of the pixels coupled to the parametric determination means.

In accordance with a fourth aspect of the present invention there is provided an apparatus for creating a blend from a first arbitrary edge to a second arbitrary edge in a computer graphic image creation system, the apparatus comprising:

edge color determination means for determining a color along each of the edges;
 edge vectorising means for vectorising each of the edges into corresponding line segments coupled to the edge color determination means;
 segment pair matching means for matching pairs of the line segments from each of the edges so as to form polygons having a defined color at their vertices coupled to the edge vectorising means; and
 pixel color determination means for determining a color for each pixel of the polygon from the defined color of the vertices coupled to the segment pair matching means.

In accordance with a fifth aspect of the present invention there is provided a method of constructing computer graphical objects, the method comprising the steps of:

providing a plurality of interactively editable splines;
 defining each of the splines to have a corresponding spline color;
 creating a blend between pairs of the splines, the blend being substantially from the spline color of a first member of the pair to the spline color of a second member of the pair.

In accordance with a sixth aspect of the present invention there is provided a method of constructing computer graphical objects, the method comprising the steps of:

providing a plurality of interactively editable splines;
 defining each of the splines to have a corresponding spline color; and
 creating a blend between pairs of the splines further comprising the steps of:
  determining a color along each of the splines;
  forming a parametric equation for a color of each pixel within the area bounded by the splines; and
  solving the parametric equation to derive a color for each of the pixels.

Typically, the spline color includes an associated opacity and the degree of opacity can take on values from fully opaque to fully transparent. Preferably the associated opacity includes a blend of degree of opacity being substantially from the opacity associated with the spline color of the first member of the pair to the opacity associated with the spline color of the second member of said pair.

In accordance with a seventh aspect of the present invention there is provided a method of constructing computer graphical objects, the method comprising the steps of:

providing a plurality of interactively editable splines;

defining each of the splines to have a corresponding spline color; and creating a blend between pairs of the splines further comprising the steps of:
  determining the color along each of the splines;
  vectorising each of the splines into corresponding line segments;
  matching pairs of the line segments from each of the splines so as to form polygons having a defined color at their vertices; and
  determining a color for each of the polygon from the defined color of the vertices.

In accordance with a eighth aspect of the present invention there is provided an apparatus for constructing computer graphical objects comprising:
  interactive editable spline generation means for providing a plurality of interactively editable splines;
  spline color defining means for defining each of the splines to have a corresponding spline color coupled to the interactive editable spline generation means; and
  spline pair blend creation means for creating a blend between pairs of the splines coupled to the spline color defining means, wherein a blend is created being substantially from the spline color of a first member of the pair to the spline color of a second member of the pair.

BRIEF DESCRIPTION OF THE DRAWINGS

Embodiments of the present invention will now be described with reference to the accompanying drawings, in which.

DETAILED DESCRIPTION

Figure 1:
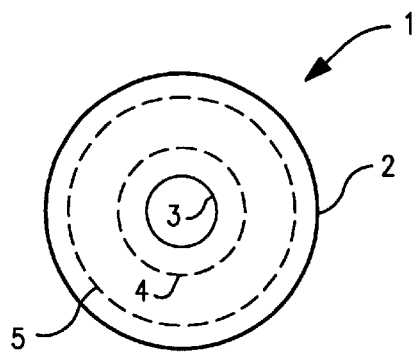
FIGS. 1 to 3 illustrate different forms of complex blends.
Figure 2:
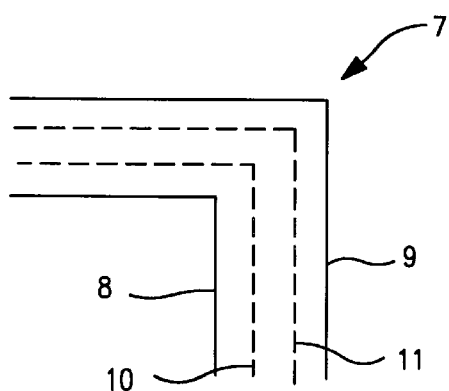
Figure 3:
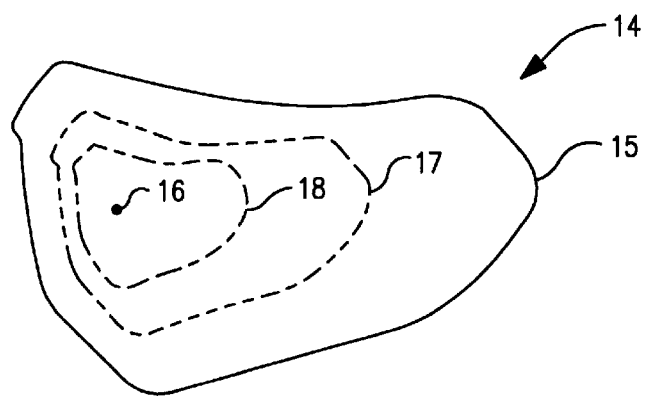

A series of complex blends are illustrated in FIGS. 1 to 3. An object 1 is shown in FIG. 1 having an outer boundary 2 and an inner boundary 3. It is desired that, for example, the outer boundary 2 is red in color and the inner boundary 3 is yellow; the colors intermediate of the two boundaries take on an aesthetically pleasing gradient from one edge to the next. For example, if boundary 3 is yellow, then when moving outwardly towards boundary 2, a series of orange-yellow pixels is encountered first, followed by a series of orange pixels, followed by a series of red-orange pixels, before arriving at the boundary which is defined to be red. A series of gradient lines 4,5 are provided to show the color contours between the two edges; the contour lines 4,5 are of constant color.

A second example 7 is shown in FIG. 2 of a required gradient between edges 8 and 9. In this example, it is desired to derive a transparency or opacity gradient, whereby the edge 8 is fully opaque and the edge 9 is fully transparent; the pixels in between take on a blend from fully opaque to fully transparent. Contour lines 10,11 are again provided to indicate pixels of constant opacity.

A third example 14 is shown in FIG. 3 of the blending process. The object 14 has a first edge 15 and a second edge that has degenerated to a single point 16. Again, it is desired that the pixels in between take on a gradient between the two values at edges 15 and 16. For example, the contour lines 17 and 18 form lines of constant color.

System Overview

Figure 4:
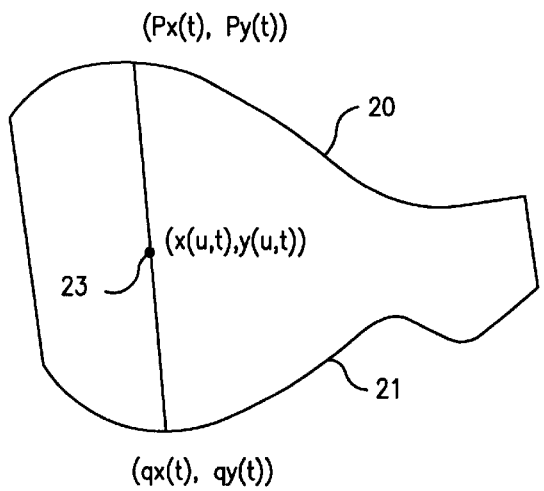
FIG. 4 illustrates the parametric form of a pixel within two edges.

A first method of implementation will now be described with reference to FIG. 4. Two splines 20, 21 are shown in FIG. 4 that are of an arbitrary nature. It is assumed, for purposes of discussion of the preferred embodiment, that graphical objects are stored within a computer system in the form of splines. Hence, it is desired to form a blend between two arbitrary splines 20, 21. In the first method, to determine a color at an arbitrary point (x,y) in the area between splines 20, 21, the splines 20, 21 are parametrically defined in a conventional manner to take on (x,y) values comprising $(p_x(t), p_y(t))$ and $(q_x(t), q_y(t))$; the parametric form of the spline takes the standard form of a cubic in t, with t ranging from 0 to 1. Any point (x,y) 23 in the area between the two splines 20, 21 can then be parametrically defined to be equivalent to a point (u,t), with u ranging from 0 to 1, according to the following equations:

$$x(u,t)=p_x(t)+(q_x(t)-p_x(t))u, \qquad (1)$$

and $$y(u,t)=p_y(t)+(q_y(t)-p_y(t))u. \qquad (2)$$

If the splines 20, 21 are defined to each be of a constant color, the color at any point (x,y) is solely dependent on u.

Thus, it is necessary to solve Equations (1) and (2) for u given values of x and y. However, the solution of Equations (1) and (2), which involve cubic parametric equations, is difficult for any other than linear functions of p and q. Further, the color solution obtained is defined in terms of 't' which is merely an artefact of the spline representation utilised to represent the edges rather then any representation of the visual appearance of the area between the edges.

In the preferred embodiment, in order to simplify the calculation of a color at each point between the splines 20, 21, both of the spline edges 20, 21 are first vectorised into straight-line segments. The process of vectorising a spline into straight-line segments is known to those skilled in the art of programming for computer graphics. For example, two methods are described in the text *Computer Graphics. Principles and Practice* written by Foley et al, Second Edition, and published in 1990 by Addison-Wesley Publishing Company Inc., Reading, Mass. A first method, described at pages 487–488 of the Foley text, divides the spline into parametrically equally-spaced portions which results in an approximation of the spline by short-line segments. A second method of vectorising a spline is described at pages 511–514 of the Foley text, and includes recursive sub-division of portions of a spline. The sub-division results in a series of line segments.

Figure 5:
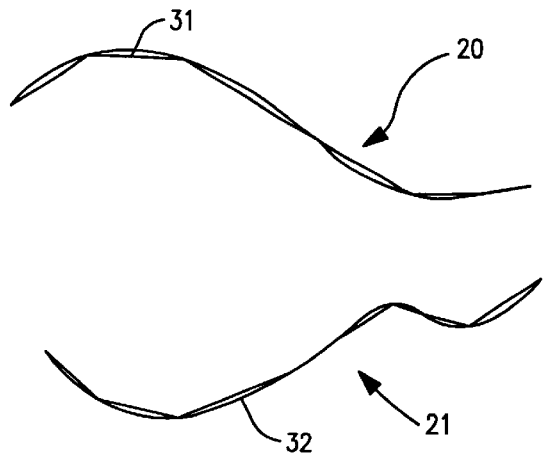
FIG. 5 illustrates the process of vectorisation of spline edges.

In an exaggerated format, the vectorisation of the splines 20, 21 into a series of line segments 31, 32 is shown in FIG. 5, for example. Once the two splines 20, 21 have been vectorised into corresponding line segments 31, 32, the ends of each line segment of each spline 20, 21 are matched with one another. A number of methods can be utilised in matching the ends of line segments. A first method is to parametrically match the endpoints of each line segment 31, 32 along the two splines 20, 21, such that, the point ($p_x(t)$, $p_y(t)$), which corresponds to a given value t, at the end of one line segment on the vectorisation of one edge 20 is matched with the point ($q_x(t)$, $q_y(t)$) on the other edge 21. A similar process is then carried out for the endpoints of each line segment of the vectorisation of edge 21. However, this approach utilises a function defined in 't', which is merely an artefact of the spline representation used to represent the edges, rather than the visual appearance of the area between the edges.

Figure 6:
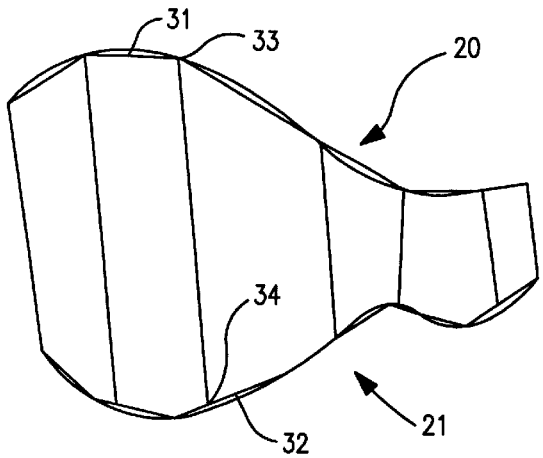
FIG. 6 illustrates the process of matching a first series of vectorised edges.

The preferred method of matching edges is by means of relative lengths along the line segments of each edge 20, 21. The length of the line segments of each of the edges 20, 21 shown in FIG. 6 are first calculated. Starting with edge 20, each end 33, for example, of each line segment 31 is examined, and a relative distance along the line segments approximating edge 20 is calculated. Subsequently, a corresponding point 34, which has the same relative distance along the line segments representing edge 21, is calculated and the points 33 and 34 are matched. This process is then repeated for each line segment of edge 21.

Figure 7:
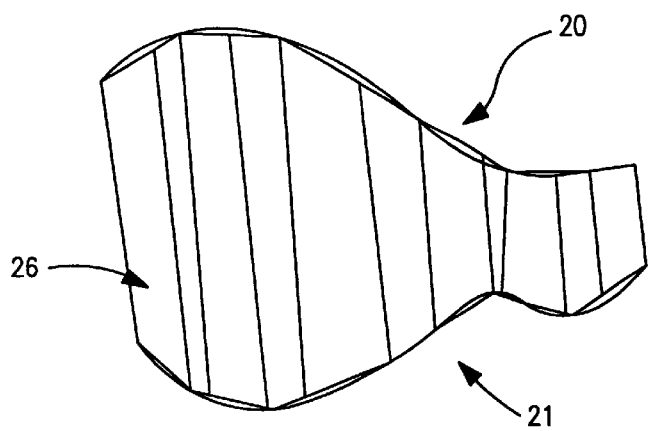
FIG. 7 illustrates forming quadrilaterals from vectorised spline edges.

The same process is repeated for the edge 21 in FIG. 7 resulting in the conversion of the area between the two edges into a series of quadrilaterals 26. Therefore, the vectorisation of both edges and the subsequent matching of points along the vectorisation reduces the problem from a cubic parametric one to a collection of adjacent quadrilaterals 26. In each of the quadrilaterals 26, Equations (1) and (2) hold independently, and the parametric functions of p and q have been reduced to piecewise linear functions in 't'. The quadrilaterals 26 are hereinafter referred to using the term "slivers". Once the area between two splines has been converted to a series of slivers (assuming it is desired to render the area between the two splines), two methods can be practised.

Figure 8:
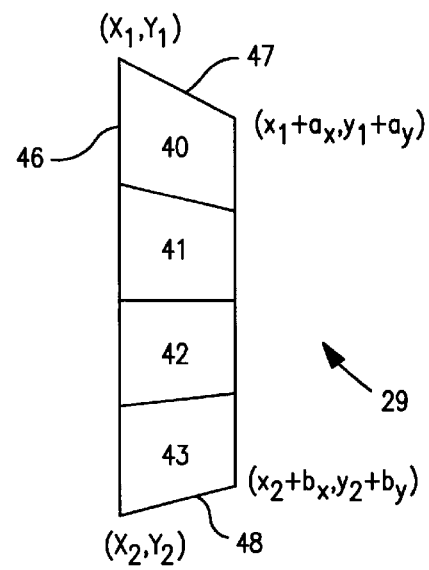
FIG. 8 illustrates dividing a quadrilateral into a series of areas of constant color.

The preferred form of rendering a 'sliver' 29 into a corresponding pixel form is shown in FIG. 8. As the color value at each of the corner points of sliver 29 is known, areas of constant color 40 to 43 can be determined by dividing each side 45, 46 of the sliver 29 into a number of equal intervals. The number of intervals depends on the difference in color between the two edges 47, 48. Each area 40 to 43 consists of a region of constant color and can be independently scan converted using conventional techniques. Where the final image is to be rendered by means of multiple-color passes in a full color imaging system, the above process may be carried out using the separate color components of each edge, which will often result in substantially larger areas 40 to 43 of constant color.

Figure 9:
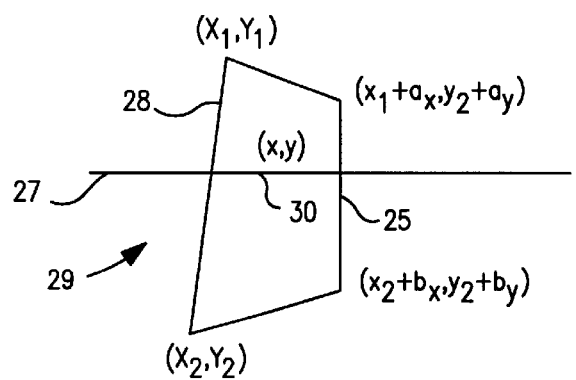
FIG. 9 illustrates a process for the determining of a color of a quadrilateral.

An alternative form of rendering each sliver shown in FIG. 9 is to determine which slivers 29, for example, intersect a current scan line 27 and the pixels between the edges 28,25 of the sliver 26. The color of each pixel between the edges 28,25 is then determined by interpolation. The single sliver 29 has vertex coordinates as shown in FIG. 9. The constants $a_x$, $a_y$ and $b_x$ and $b_y$ are determined from the vectorisation of the spline into line segments and subsequent formation of slivers. In order to test whether a pixel scan line intersects a sliver, it is only necessary to determine the minimum and maximum x coordinates of the four points defining each sliver 29 and to test whether or not a scan line 27 lies within the sliver 29.

Given a pixel 30, having co-ordinates (x,y), the value of u on which the pixel's color depends is the solution of the following quadratic equation:

$$[(x_2-x_1)(b_y-a_y)-(y_2-y_1)(b_x-a_x)]u^2+$$
$$[a_y(x_2-x_1)-a_x(y_2-y_1)-(b_y-a_y)(x-x_1)+$$
$$(b_x-a_x)(y-y_1)]u+[a_x(y-y_1)+a_y(x-x_1)]=0. \quad (3)$$

Equation (3) need not be calculated for each pixel as it is possible to use the solution for u(x,y) as an initial estimate for deriving the color for the next pixel u(x+1,y) using Newton's method, which is likely to converge after one or two iterations. The formula for Newton's method is as follows:

$$Au^2+Bu+C=0 =>u_{i+1}=(Au_i^2-C)/(2Au_i+B), \quad (4)$$

where A, B and C are the usual corresponding portions of the quadratic equation set out in Equation (3). However, it should be noted that with Equation (4), the denominator may approach zero such that the error produced by Newton's method would be unsatisfactory. In this case, a separate check can be implemented to determine the value of the denominator, and the value of pixel (x,y+1) can be determined from first principles by solving Equation (3).

While the foregoing embodiments have been described with reference to blending colors, it will be apparent to a person skilled in the art that color can include opacity and therefore the methods can be practised using opacity, or in combination with blends of color as well, at any point in the area between two splines. Likewise, the following embodiments are generally described with reference to color values to simplify description of the invention. However, it will be apparent to a person skilled in the art that the embodiments of the invention are equally applicable to opacity without departing from the scope and spirit of the invention.

Figure 12:
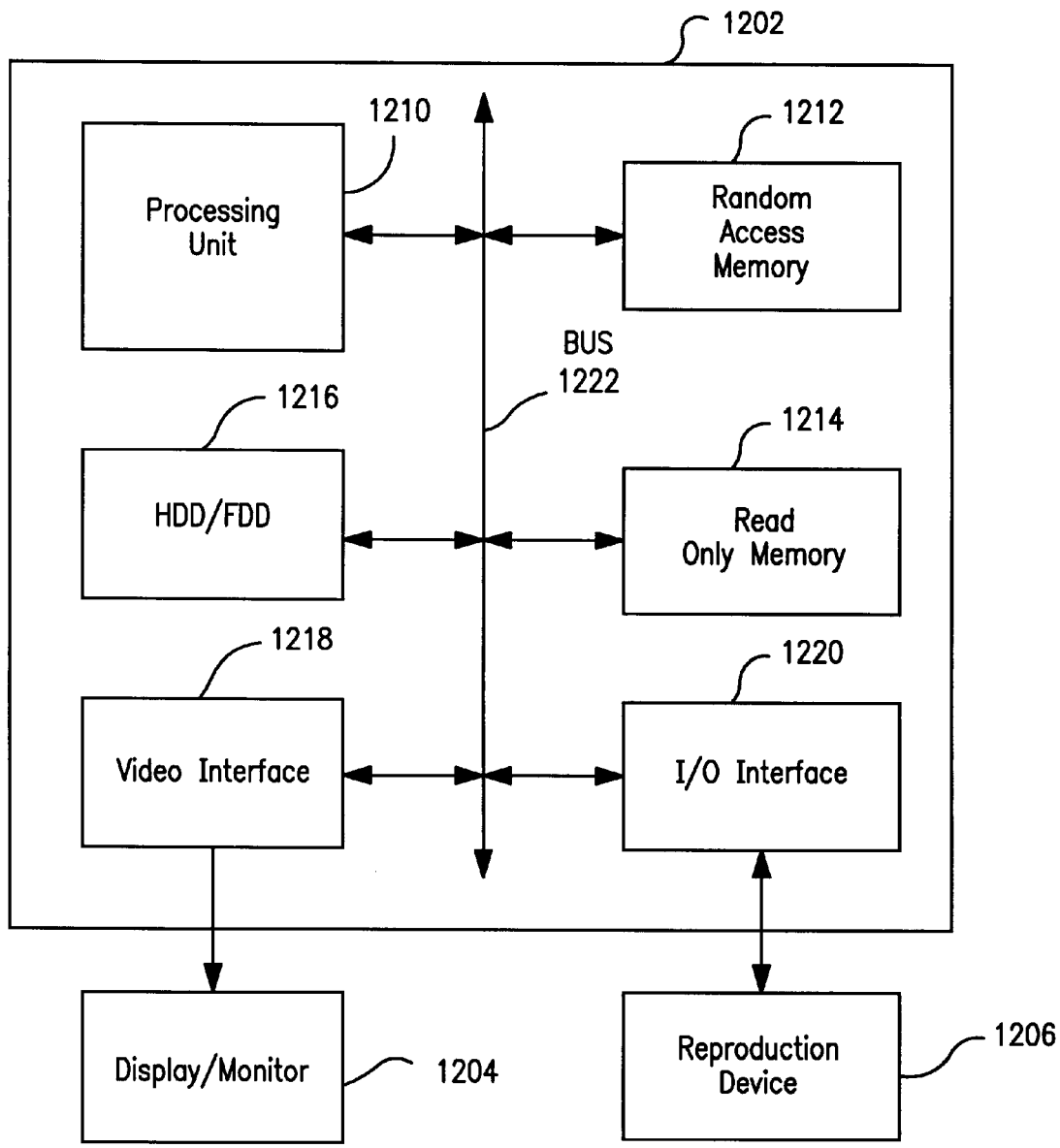
FIG. 12 is a block diagram illustrating a general purpose computer.

The methods and apparatuses according to the embodiments of the invention can be practiced using a general purpose computer 1202 (ie., a personal computer) shown in FIG. 12, for example. As is well known in the art, such a computer 1202 typically comprises a central processing unit 1210 coupled to a memory device for storing data and instructions to operate the central processing unit 1210. For example, general purpose computers commonly include random access memory (RAM) for temporarily storing data and instructions, as well as secondary storage devices (e.g., hard disc drives HDD and floppy disc drives FDD) for storing data and instructions either temporarily or permanently.

As shown in FIG. 12, the processing unit 1210 is coupled to a bus 1222, which is well known in the art. Such a bus 1222 typically includes an address bus, data bus, control signals, and the like. In turn, random access memory 1212, read only memory 1214, hard disc drive/floppy disc drive (HDD/FDD) 1216, video interface 1218, and Input/Output (I/O) interface 1220 are coupled to the bus 1222. The video interface 1218 provides output to display/monitor 1204. Likewise, I/O interface 1220 is connected to a reproduction device 1206. Reproduction device 1206 may include laser beam printers, plotters, dot matrix printers, and the like. Accordingly, methods and apparatuses for creating complex blends and images according to the embodiments of the invention, as will be described, can be implemented using such a general purpose computer.

Figure 10:
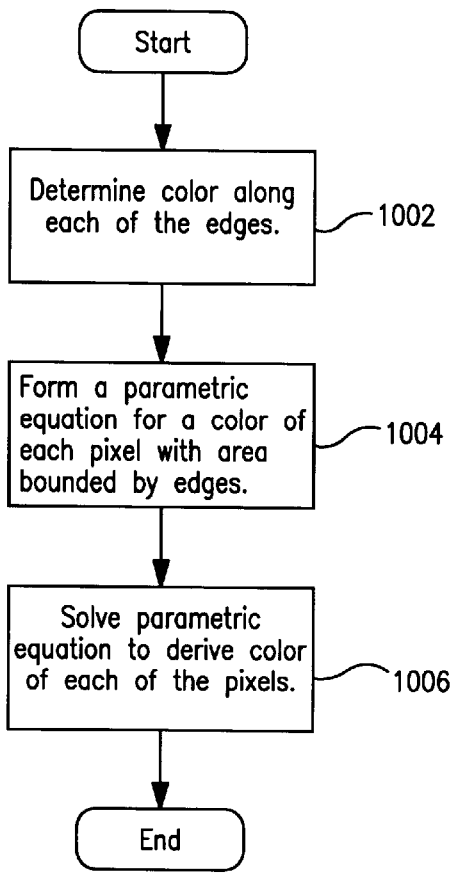
FIG. 10 is a flow diagram illustrating a method of creating complex blends within images according to the preferred embodiment.

A flowchart of a method for creating a blend of color and/or opacity from one arbitrary edge to a second arbitrary edge in a computer graphic image creation system according to the preferred embodiment is shown in FIG. 10. The method comprises the following steps. In step 1002, the color along each of the edges is determined. In step 1004, a parametric equation is formed for a color (an opacity) of each pixel within the area bounded by the edges. In step 1006, the parametric equation is solved to derive a color (opacity) for each of the pixels.

Figure 13:
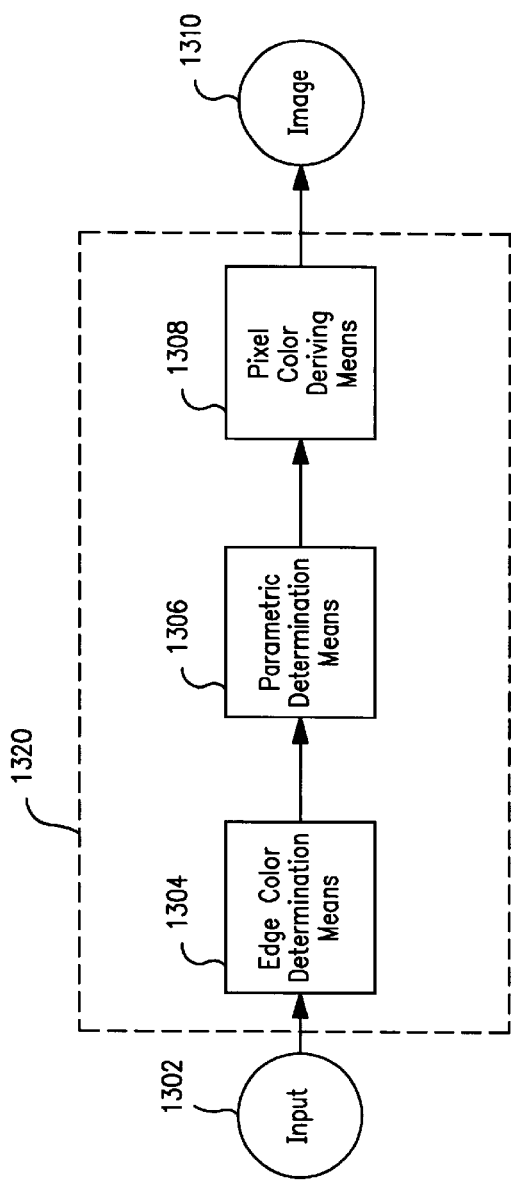
FIG. 13 is a block diagram illustrating an apparatus for creating complex blends within images implemented in accordance with the method of the preferred embodiment.

An apparatus 1320 for creating a blend from one arbitrary edge to a second arbitrary edge and a computer graphic image creation system is illustrated in FIG. 13. The apparatus 1320 receives input 1302 consisting of a number of edges. The input 1302 is provided to edge color (opacity) determination means 1304 for determining a color (opacity) along each of the edges. The output of edge color (opacity) determination means 1304 is provided to parametric determination means 1306 which form a parametric equation for a color (opacity) of each pixel within the area bounded by the edges. The output of parametric determination means 1306 is provided to pixel color (opacity) deriving means 1308. Pixel color deriving means 1308 solves the parametric equation provided by parametric determination means 1306 to derive a color (opacity) for each of the pixels and produces the output image 1310.

Figure 11:
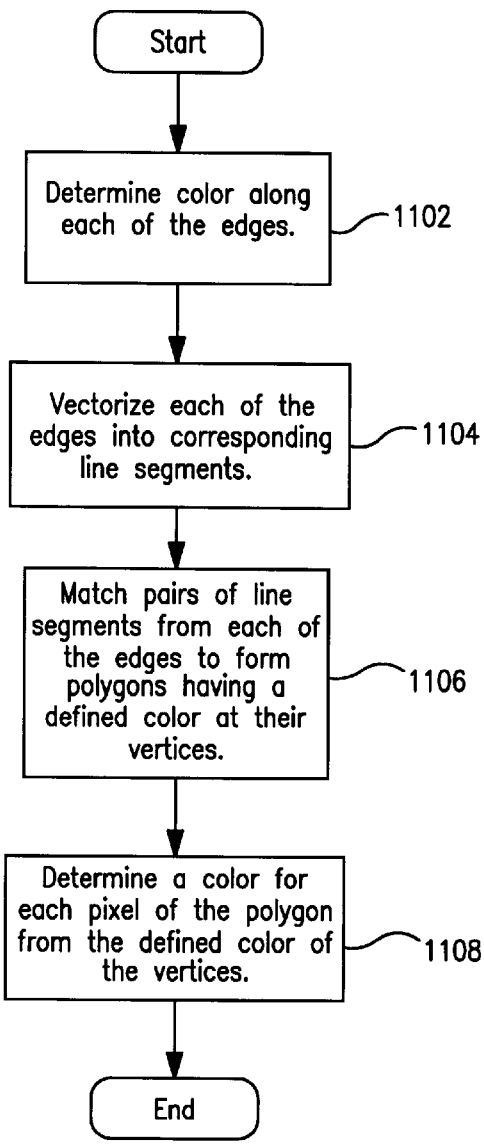
FIG. 11 is a flow diagram illustrating a method of creating complex blends within images according to further embodiment of the invention.

A flowchart of a method for creating a blend color and/or opacity from a first arbitrary edge to a second arbitrary edge in a computer graphic image creation system according to a second embodiment is shown in FIG. 11. The method comprises the following steps. In step 1102, a color along each of the edges is determined. In step 1104, each of the edges is vectorised into corresponding line segments. In step 1106, pairs of the line segments from each of the edges are matched so as to form polygons having a defined color at their vertices. In step 1108, a color for each pixel of the polygon is determined from the defined color of the vertices.

Preferably, step 1106 further comprises matching pairs of line segments in accordance with their relative distance along each of the edges.

Preferably, step 1106 further comprises matching pairs of line segments in accordance with their parametric distance along each of the edges.

Preferably, step 1108 comprises dividing the polygon into regions of constant color and rendering each region of constant color.

Figure 14:
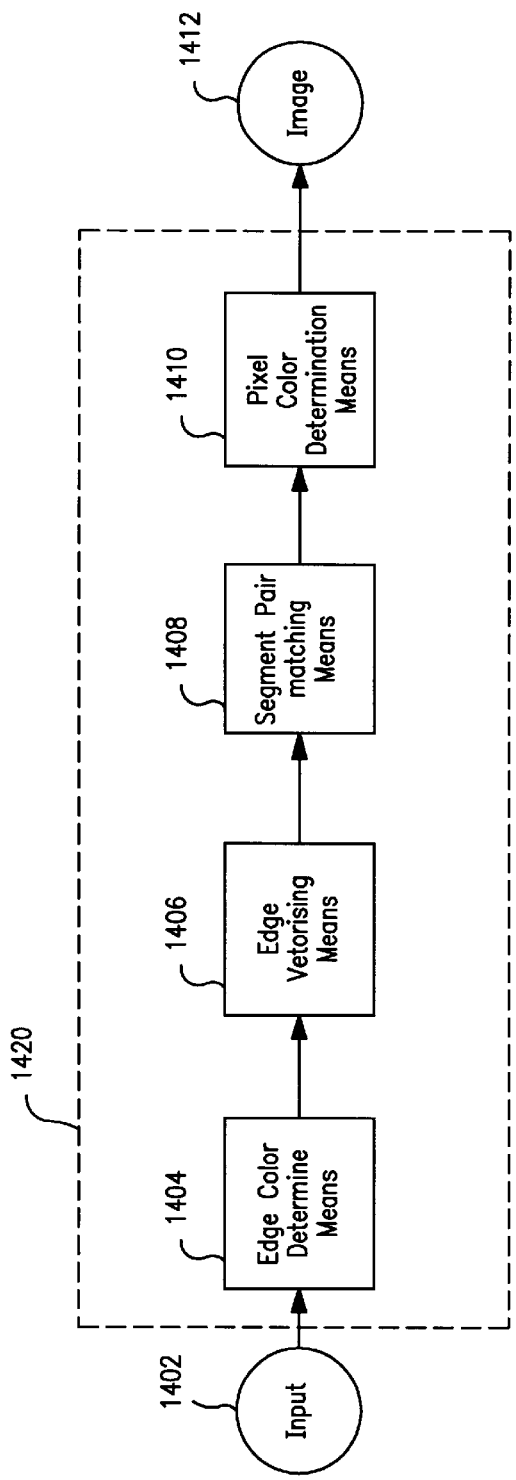
FIG. 14 is a block diagram illustrating another apparatus for creating complex blends within images implemented in accordance with the method of the further embodiment.

An apparatus 1420 for creating a blend from a first arbitrary edge to a second arbitrary edge in a computer graphic image creation system is illustrated in FIG. 14. The apparatus 1420 receives input 1402 consisting of a number of arbitrary edges. The input data 1402 is provided to edge color determination means 1404. Edge color determination means 1404 determines a color along each of the edges and its output is provided to edge vectorising means 1406. Edge vectorising means 1406 vectorises each of the edges to corresponding line segments. The output of edge vectorising means 1406 is provided to segment pair matching means 1408. Segment pair matching means 1408 matches pairs of the line segments from each of the edges to form polygons having a defined color at their vertices. The output of segment pair means 1408 is provided to pixel color determination means 1410. Pixel color determination means 1410 determines a color for each pixel of the polygon from the defined color of the vertices. The output of pixel color determination means 1410 is provided as the output image 1412.

Preferably, segment pair matching means 1408 matches pairs of line segments in accordance with their relative distance along each of the edges. Alternatively, segment pair matching means 1408 matches pairs of line segments in accordance with their parametric distance along each of the edges.

Preferably, pixel color determination means 1410 divides the polygon into regions of constant color and renders each region of constant color.

Multiple Edges

Further embodiments of the invention provide a system for creating a complex blend of an object using interactive input devices, such as a computer mouse and keyboard in conjunction with a video display unit on a standard computer system such as a personal computer running the Microsoft Windows 3.1 (trade mark) or latter or other standard graphical user interface operating systems known to those skilled in the art of creating complex computer graphics application packages.

Figure 15:
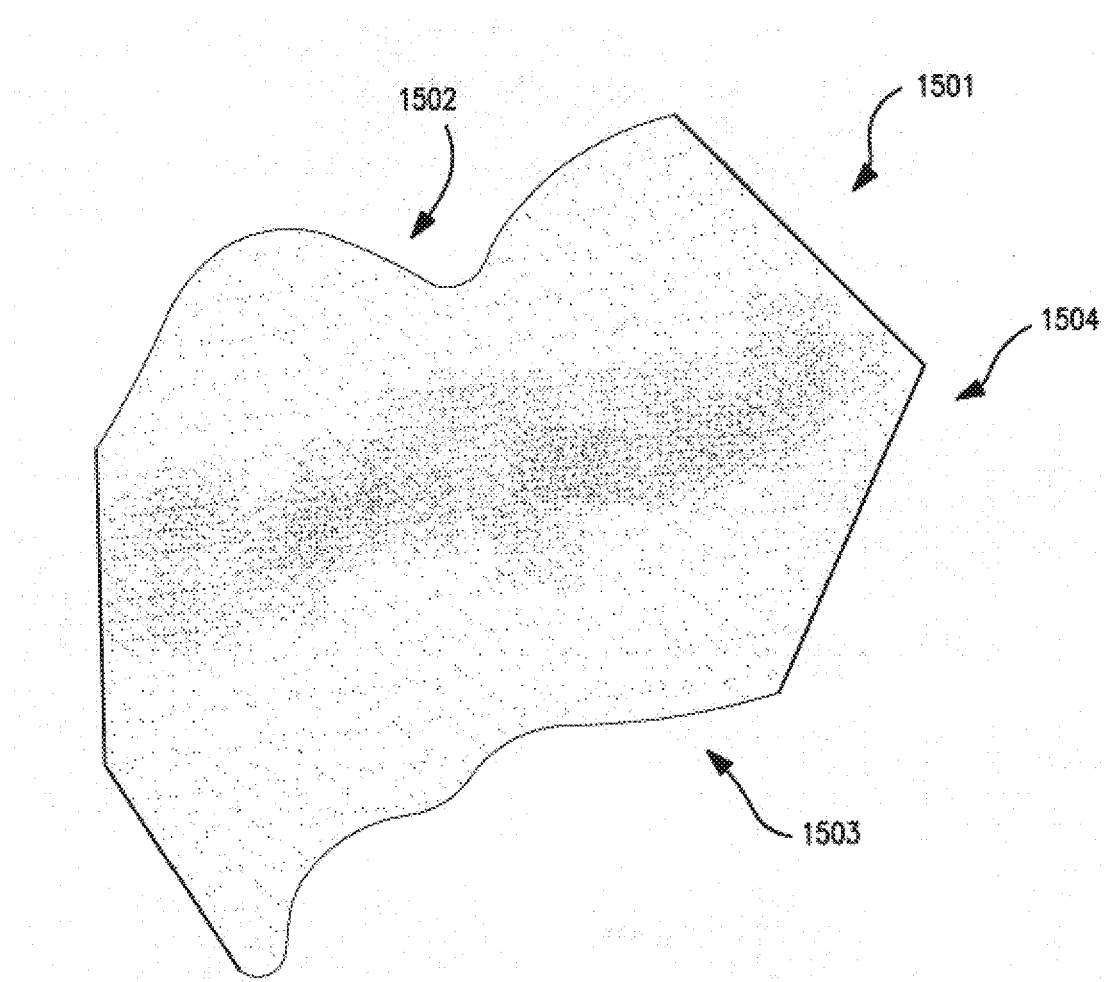
FIG. 15 illustrates an example of a complex object to be created in accordance with a still further embodiment of the invention.

Referring now to FIG. 15, there is shown a simple example of a computer graphical object 1501 created utilising the preferred embodiment. The simple example of computer object 1501 consists of two border areas 1502, 1503 having a white or near white color, and a central area 1504 having a darker color. It will be readily apparent to those skilled in the art that the lighter and darker colors are arbitrarily chosen and could be any colors able to be created by a computer graphics application package. Further, it will be apparent to a person skilled in the art that the following embodiments of the invention are equally applicable to opacity. The actual colors used depends on the type of device utilised, with common computer systems allowing for 24-bit color, which allows the display of over 16 million separate colors. Further, a color can also have transparency components as is known in the art.

The first step in creating such a complex object 1501, in accordance with this further embodiment, is to create an outline format consisting of a number of splines, created in the conventional way.

Figure 16:
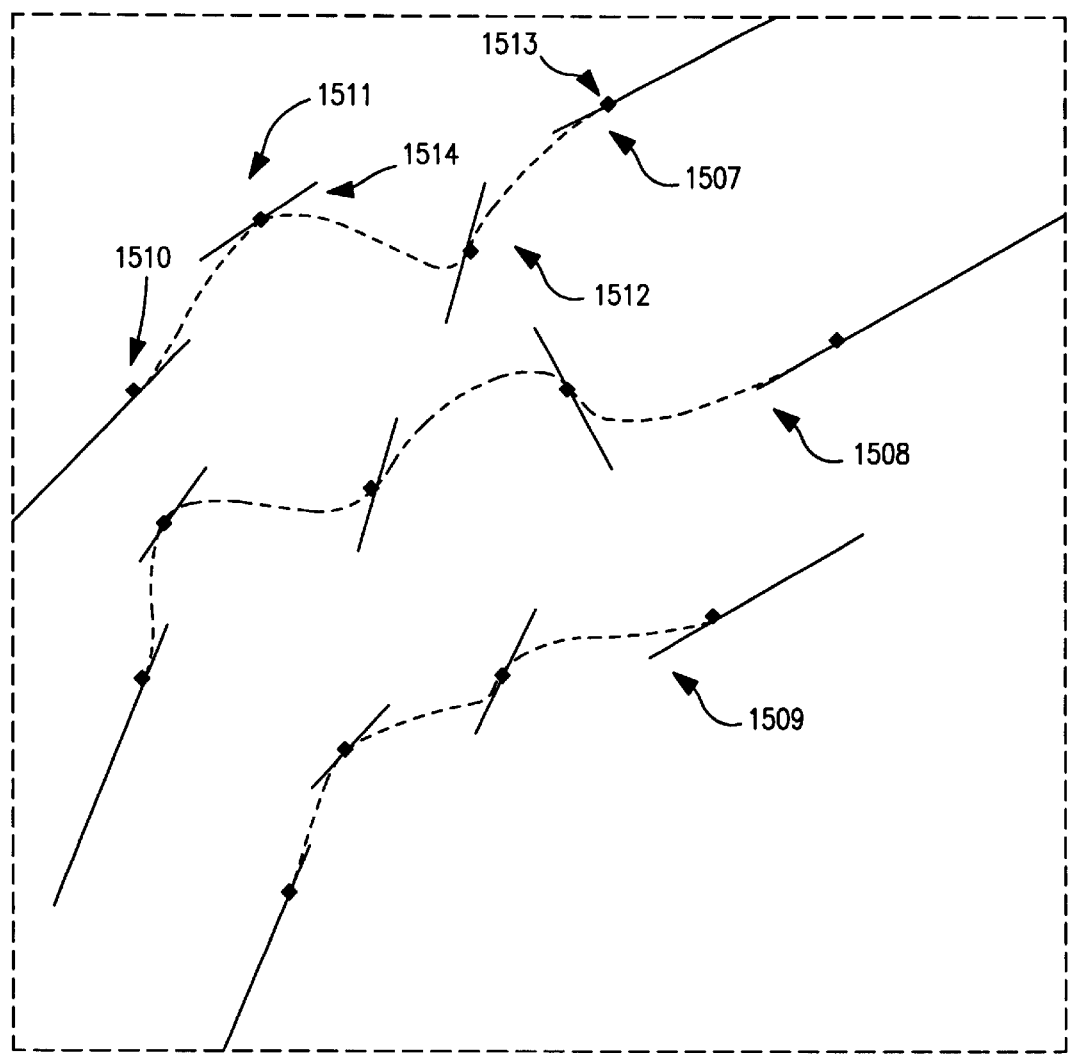
FIG. 16 illustrates the format of splines utilised to construct the object of FIG. 15.

Three splines 1507, 1508 and 1509 are shown in FIG. 16. Each spline, e.g. 1507, has a number of control points 1510 to 1513. These control points can be individually moved under a graphics application program and, in addition, can have their tangential interactive editing portions 1514 individually altered. The display and editing of spline data is well known to those skilled in the art, and is explained in detail in Chapter 11 of the text *Computer Graphics: Principles and Practice*, written by Foley, Van Dam, et. al., Second Edition, published in 1990 by the Addison-Wesley Publishing Company Inc.

Figure 17:
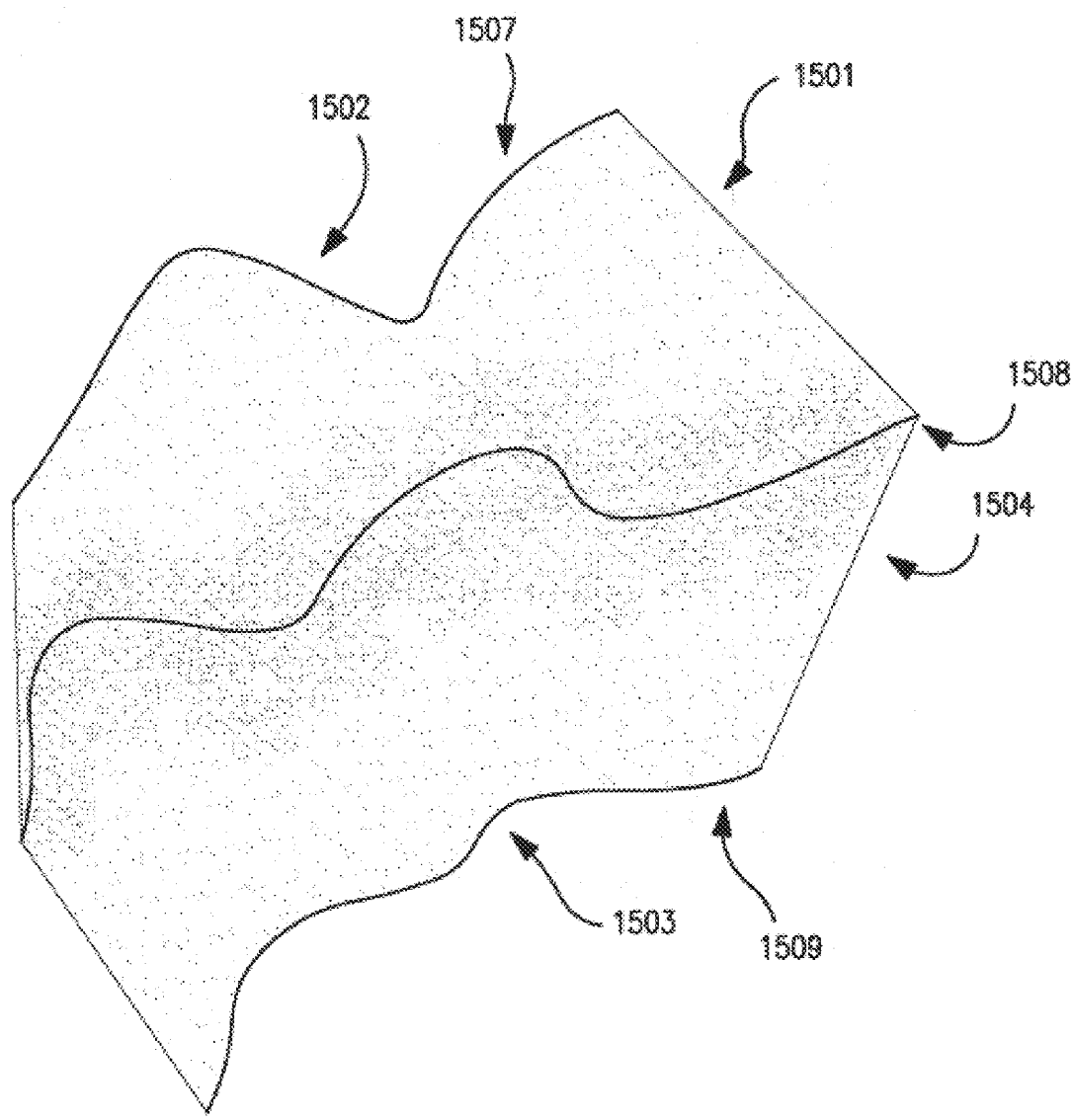
FIGS. 17 and 18 illustrate the process of construction of the object of FIG. 15.

As described above, embodiments of the invention provide a system for creating an arbitrary blend between a first spline, having a first predetermined color, and a second spline, having a second predetermined color. Spline 1507 can be independently defined to be of a first color (in this example, white). Spline 1508 is defined to be a second color (in this particular instance, black) and spline 1509 can be defined to be the first color (again, white). Therefore, by applying one of the methods set out above independently to the two splines 1507 and 1508 and second to the two splines 1508 and 1509, the effect illustrated in FIG. 15 can be achieved. This is perhaps better illustrated in FIG. 17, where there is shown the computer graphical object 1501 of FIG. 15 in addition to the three splines 1507 to 1509 utilised in creating the object 1501.

Figure 18:
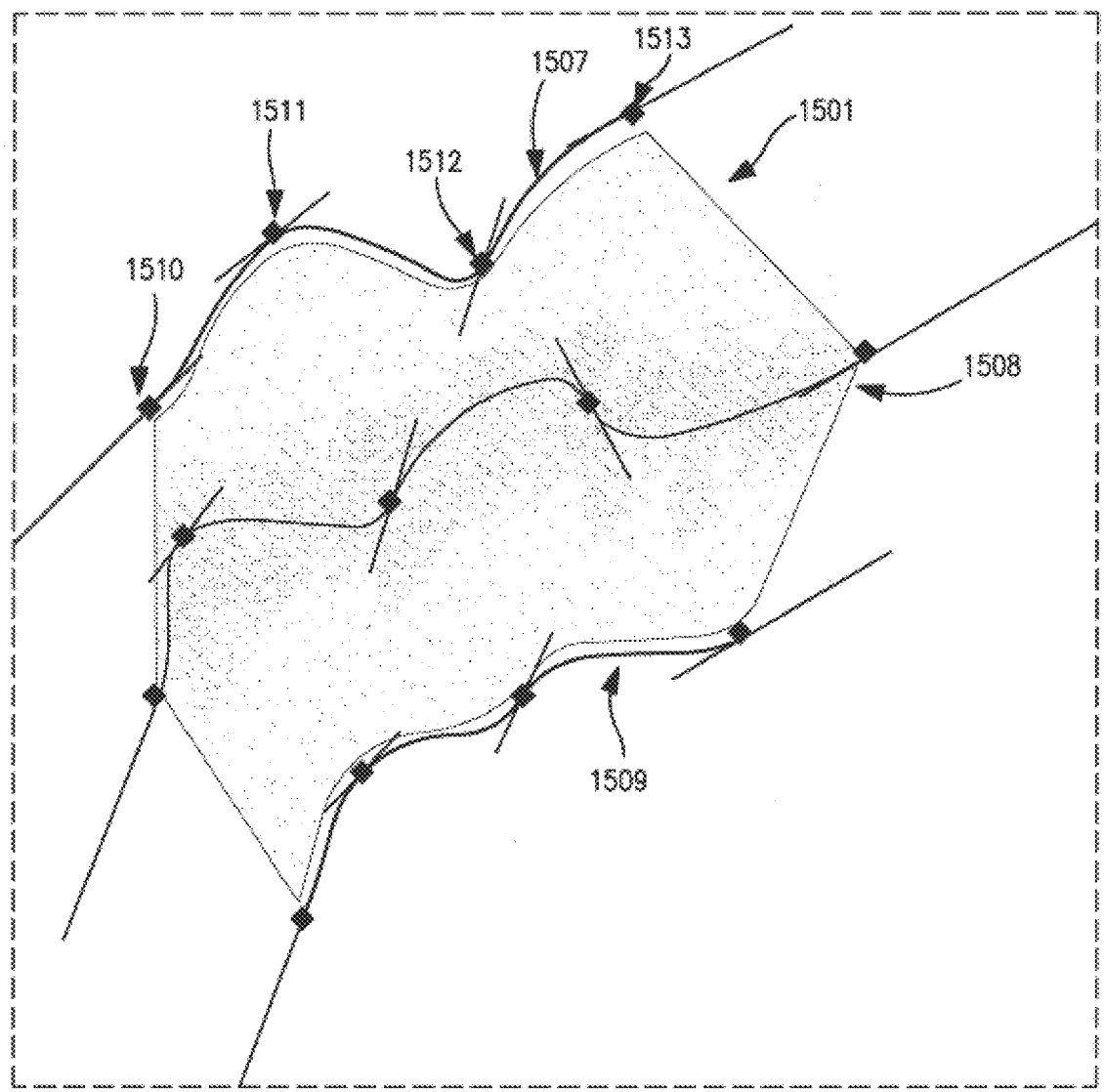

Further, turning now to FIG. 18, the computer graphical object 1501 of FIG. 15 is illustrated in addition to the associated construction splines 1507, 1508 and 1509. In this particular view, the spline control points, e.g. 1510 to 1512, are also illustrated. The preferred form of user interface for the system for creating objects such as computer graphical object 1501 is to allow for the interactive manipulation of the various spline control points, e.g. 1510 to 1513, of each spline 1507 to 1509. The splines 1507 to 1509 can then be manipulated in the conventional manner and, after manipulation, the process as described previously can be applied independently to each of the splines 1507,1508 and 1508,1509 to produce a corresponding graphical object 1501.

Figure 19:
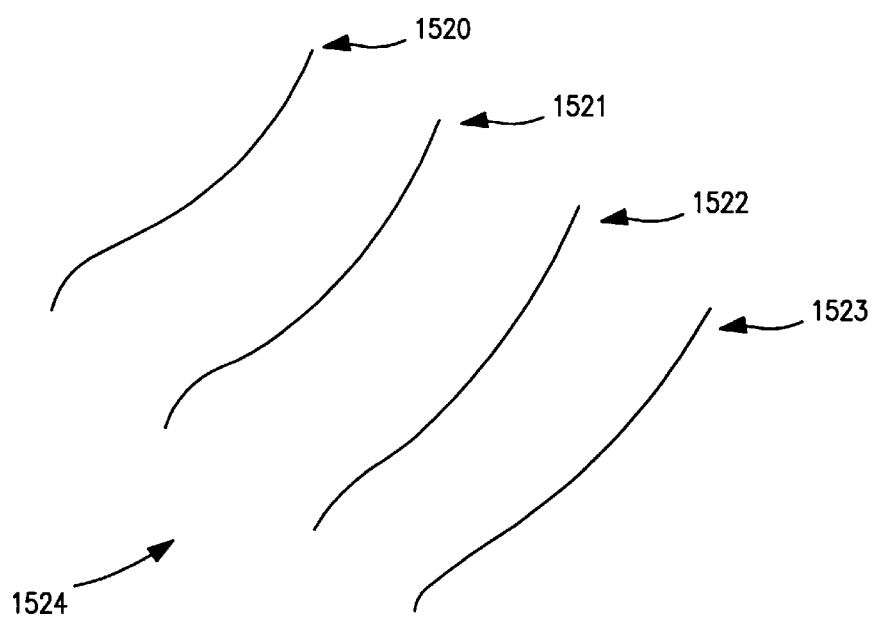
FIGS. 19 and 20 illustrate extensions of yet another embodiment of the invention to other forms of splines.

The principles for creating complex objects as outlined above can be readily extended to other arrangements. For example, turning now to FIG. 19, a more complex system having four splines 1520 to 1523 can just as easily be created. Each of the splines 1520 to 1523 can be independently defined to have a predetermined color and the process described above can be applied to the pairs of splines independently. The matching pairs are splines 1520 and 1521, 1521 and 1522, and 1522 and 1523. The splines 1520 to 1523 can be interactively and independently manipulated as hereinbefore described. As an example, if the spline 1520 is defined to be the color white, spline 1521 defined to be the color black, spline 1522 also defined to be the color black and spline 1523 defined to be the color white, then the result in object 1524 will comprise a blend from white to black from spline 1520 to 1521 followed by a band of black from splines 1521 to 1522 and then a second blend from black to white from splines 1522 to 1523.

Figure 20:
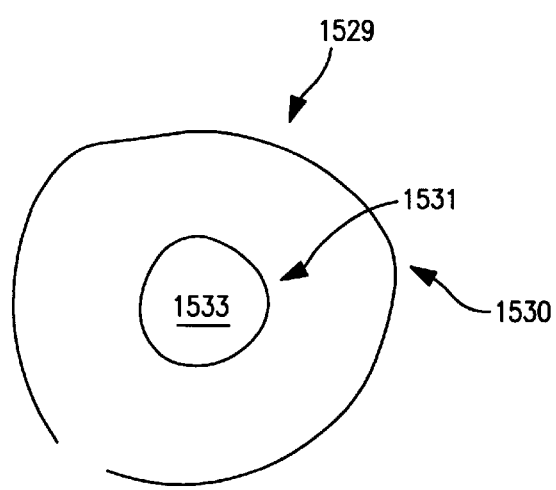

A further refinement is illustrated in FIG. 20, wherein the object 1529 is constructed from two splines 1530,1531. The two splines 1530,1531 can again be interactively edited and the resulting object comprising a blend from spline 1530 to 1531. The internal area 1533 of spline 1531 can then be defined as having a constant color, preferably being the same as that of the spline 1531. The resulting object 1529 produced was found to have quite pleasing characteristics.

Figure 23:
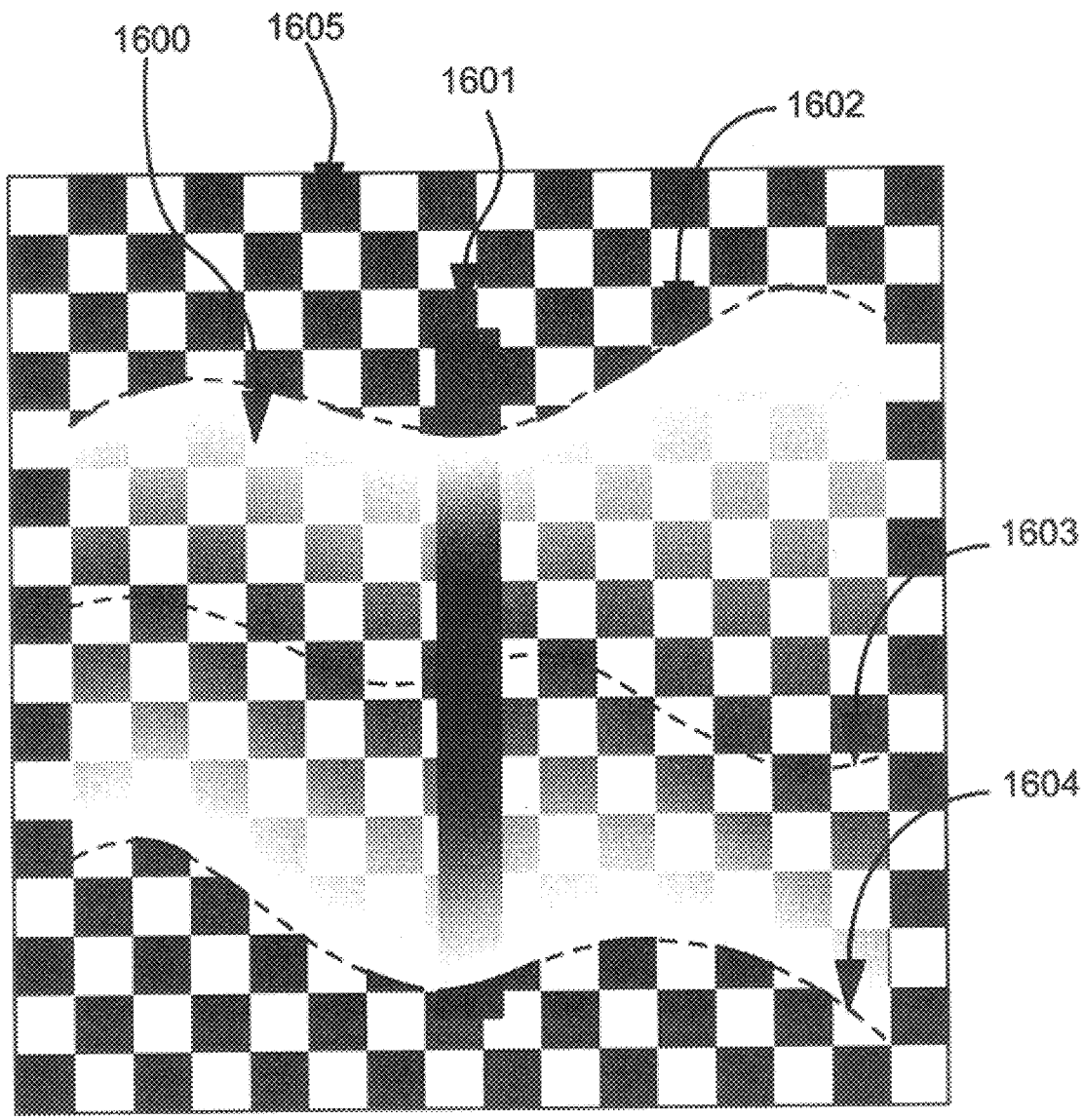
FIG. 23 illustrates an extension of the embodiment in respect of FIGS. 19 and 20.

A further embodiment of the present invention is described with reference to FIG. 23 which illustrates a blend of opacity (or a transparency component) in the color. A first computer graphical object 1600 is constructed, for example, of splines 1602, 1603 and 1604. A second graphical object 1601 and a chequered background 1605 is shown juxtaposed behind the first graphical object 1600 to illustrate a blend in the degree of opacity. The splines 1602, 1603 and 1604 can be interactively and independently manipulated as described previously.

In this example, it is desired that the spline 1602 is white in color and fully opaque, spline 1603 is fully transparent and spline 1604 is also white in color and fully opaque. For the sake of clarity, the splines 1602, 1603 and 1604 have been shown in FIG. 23 as exaggerated dashed lines to indicate the position of the splines 1602, 1603 and 1604 on the graphical object respectively. Intermediate spline 1602 and spline 1603, the first computer graphical object 1600 takes on a blend from fully opaque white at spline 1602 to fully transparent at spline 1603. Similarly, between spline 1603 and spline 1604 the first graphical object 1600 takes on a blend from fully transparent at the spline 1603 to fully opaque white at spline 1604. Preferably, each spline 1602, 1603, 1604 is of a predetermined color and opacity, and intermediate each pair of splines 1602, 1603 and 1604 a blend of both color and opacity is achieved.

Figure 21:
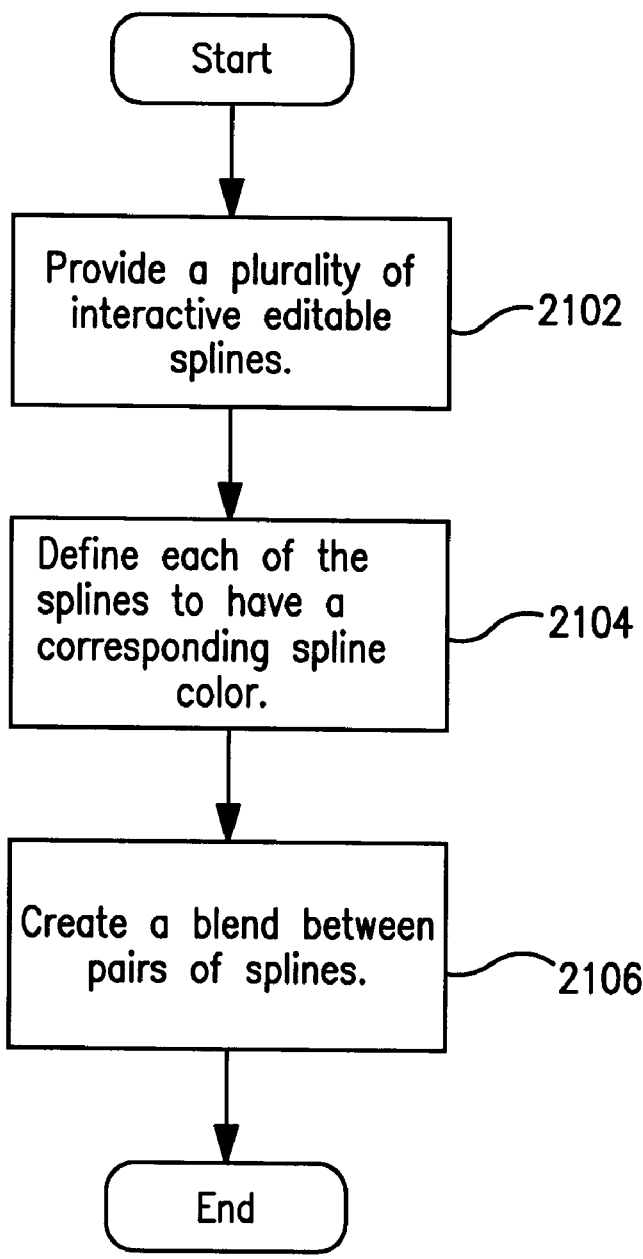
FIG. 21 is a flow diagram of the method of constructing computer graphical objects according to the still further embodiment.

A flow diagram of a method of constructing computer graphical objects is illustrated in FIG. 21. In step 2102, a plurality of interactively editable splines are provided. In step 2104, each of the splines is defined to have a corresponding spline color. In step 2106, a blend is created between the pair of splines. The blend is substantially from the spline color of a first member of the pair to the spline color of a second member of the pair. Preferably, the number of splines is three, and a first and second of the spline has substantially the same color. A first of the pairs comprises a blend from the first of the splines to a third of the splines. A second of the pairs comprises a blend from a second of the splines to the third of the splines.

Preferably a second plurality of the splines have the spline color.

Preferably, the number of splines is four, and a first and second of the splines are substantially the same spline color. A first of the pairs comprises a blend from the first of the splines to a third of the splines. A second of the pairs comprises a blend from the first of the splines to the second of the splines. A third of the pairs comprises a blend from the second of the splines to a fourth of the splines.

Preferably, at least one of the splines forms an internal area and the internal area is also defined to have the spline color of the at least one of the splines.

It will be obvious to those skilled in the art that a myriad of complex objects can be created by providing a system of splines which can be interactively edited in the normal manner, with each spline having a predefined color (opacity) and rendering a blend between predetermined pairs of splines. By allowing the splines to be continuously interactively edited, and re-rendering the splines after each editing, a system for the creation of extremely complex objects results.

Step 2106 can be implemented in accordance with the method of creating a blend illustrated in either FIG. 10 or FIG. 11.

Figure 22:
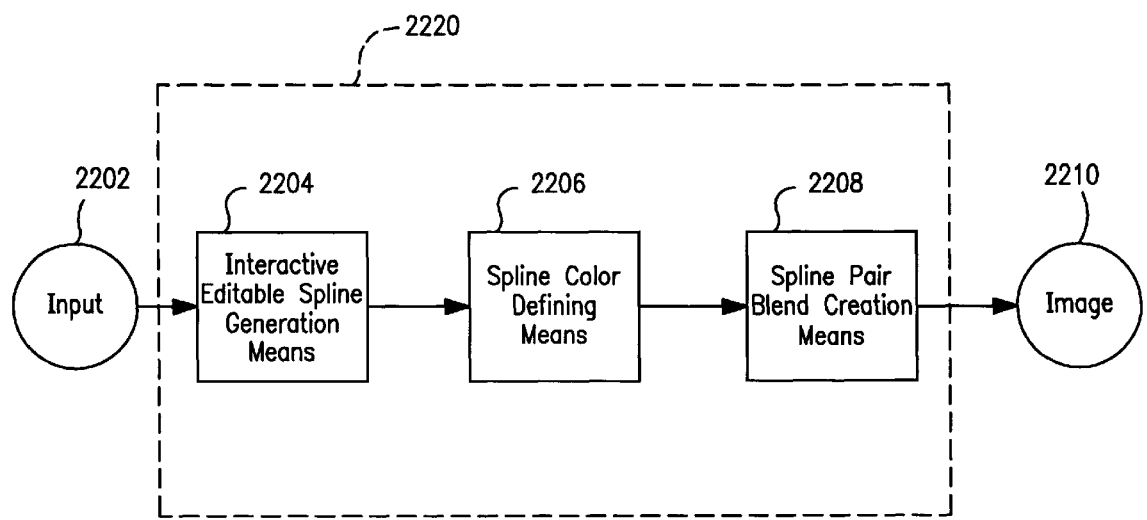
FIG. 22 is a block diagram illustrating an apparatus for constructing computer graphical objects in accordance with the method of FIG. 21.

As described above, the method of this further embodiment of the invention can be implemented using a general purpose computer. An apparatus for constructing computer graphical objects in accordance with this method is illustrated in FIG. 22. The apparatus 2220 can be implemented using a general purpose computer, for example. A user provides input 2202 to the apparatus 2220, and in particular to interactive editable spline generation means 2204. Interactive editable spline generation means 2204 receives the user input to provide a plurality of interactively editable splines. The output of interactive editable spline generation means 2204 is provided to spline color defining means 2206, which defines each of the splines to have a corresponding spline color. The output of spline color defining means 2206 is provided to spline pair blend creation means 2208. Spline pair blend creation means 2208 creates a blend between pairs of the splines in which the blend is substantially from the spline color of a first member of the pair to the spline color of a second member of the pair. The output of spline pair blend creation means 2208 is an image 2210, which is the output of the apparatus 2220. As described above, spline pair blend creation means 2208 can be implemented using the apparatus 1320 of FIG. 13 or apparatus 1420 of FIG. 14.

The foregoing describes only a small number of embodiments of the present invention with minor modifications, and further modifications, obvious to those skilled in the art, can be made thereto without departing from the scope of the invention.

What is claimed is:

1. A method of creating a blend from a first arbitrary spline edge to a second arbitrary spline edge in a computer graphic image creation system, said method comprising the steps of:

determining a color along each of said spline edges;

vectorising each of said spline edges into a series of corresponding linear line segments;

matching linear line segments, or portions thereof, from each of said spline edges by matching equal relative distances along said spline edges, so as to form polygons whose edges include said linear line segments, or portions thereof, having a defined color at their vertices; and determining a color for each pixel of each said polygon from said defined color of said vertices.

2. The method according to claim 1, wherein said linear line segment matching step further comprises matching pairs of points that lie on said linear line segments in accordance with their relative distance along the series of corresponding line segments for each of said spline edges, said line segments being subdivided to form said polygons.

3. The method according to claim 1, wherein said linear line segment matching step further comprises matching pairs of points that lie on said linear line segments in accordance with their parametric distance along the series of corresponding line segments for each of said spline edges, said line segments being subdivided to form said polygons.

4. The method according to claim 1, wherein said step of determining a color for each pixel comprises dividing the polygon into regions of constant color and rendering each region of constant color.

5. The method according to claim 1, wherein said color comprises an opacity and said defined color comprises a defined opacity.

6. The method according to claim 1, whereby said matching step is adapted to calculate a portion of the linear line segments corresponding to the first spline edge having a same relative distance as a distance along a corresponding linear line segment of the second spline edge and to match the linear line segments by matching the ends of the calculated portion corresponding to the first spline edge with the ends of the corresponding linear line segment of the second spline edge.

7. The method according to claim 1, wherein a number of regions into which each polygon is divided is dependent upon a difference in color between the two spline edges.

8. The method according to claim 1, wherein the equal relative distances along said spline edges are determined in accordance with a relative distance along the corresponding line segments for each spline edge.

9. The method according to claim 1, wherein the equal relative distances along said spline edges are determined in accordance with a parametric distance along each spline edge.

10. The method according to claim 1, wherein said step of matching linear line segments comprises the sub-steps of:

(i) determining first distances, relative to an aggregate length of the first arbitrary spline edge, of the endpoints of each line segment of said first edge;

(ii) determining second distances, relative to an aggregate length of the second arbitrary spline edge, of the endpoints of each line segment of said second edge; and (iii) for each line segment end point on the first arbitrary spline edge, interpolating a point on the second arbitrary spline edge with the same relative distance along said second edge as the relative distance of said line segment endpoint along said first edge, thereby matching a point on said first edge with a point on said second edge and forming a corresponding matched point pair;

(iv) for each line segment end point on the second arbitrary spline edge, interpolating a point on the first arbitrary spline edge with the same relative distance along said first edge as the relative distance of said line segment endpoint along said second edge, thereby matching a point on said second edge with a point on said first edge and forming a corresponding matched point pair; and (v) forming at least one polygon each comprising consecutive matched point pair.

11. An apparatus for creating a blend from a first arbitrary spline edge to a second arbitrary spline edge in a computer graphic image creation system, said apparatus comprising:

spline edge color determination means for determining a color along each of said spline edges;

spline edge vectorising means for vectorising each of said spline edges into a series of corresponding linear line segments coupled to said spline edge color determination means;

linear line segment matching means for matching linear line segments, or portions thereof, from each of said spline edges by matching equal relative distances along said spline edges, so as to form polygons whose edges include said linear line segments, or portions thereof, having a defined color at their vertices coupled to said spline edge vectorising means; and pixel color determination means for determining a color for each pixel of each said polygon from said defined color of said vertices coupled to said linear line segment pair matching means.

12. The apparatus according to claim 11, wherein said linear line segment pair matching means further comprises means for matching pairs of points that lie on said linear line segments in accordance with their relative distance along the series of corresponding line segments for each of said spline edges, said line segments being subdivided to form said polygons.

13. The apparatus according to claim 11, wherein said linear line segment pair matching means further comprises means for matching pairs of points that lie on said linear line segments in accordance with their parametric distance along the series of corresponding line segments for each of said spline edges, said line segments being subdivided to form said polygons.

14. The apparatus according to claim 11, wherein said pixel color determination means comprises means for dividing the polygon into regions of constant color and rendering each region of constant color.

15. The apparatus according to claim 11, wherein said color comprises an opacity and said defined color comprises a defined opacity.

16. The apparatus according to claim 11, wherein said linear line segment matching means is adapted to calculate a portion of the linear line segments corresponding to the first spline edge having a same relative distance as a distance along a corresponding linear line segment of the second spline edge and to match the linear line segments by matching the ends of the calculated portion corresponding to the first spline edge with the ends of the corresponding linear line segment of the second spline edge.

17. The apparatus according to claim 11, wherein a number of regions into which each polygon is divided is dependent upon a difference in color between the two spline edges.

18. The apparatus according to claim 11, further comprising:
displaying means for displaying the image on a basis of the determined color of the pixel.

19. The apparatus according to claim 11, further comprising:
printing means for printing the image on a basis of the determined color of the pixel.

20. The apparatus according to claim 11, wherein the equal relative distances along said spline edges are determined in accordance with a relative distance along the corresponding line segments for each spline edge.

21. The method according to claim 11, wherein the equal relative distances along said spline edges are determined in accordance with a parametric distance along each spline edge.

22. An apparatus according to claim 11, wherein said linear line segment matching means comprises:
means for determining first distances, relative to an aggregate length of the first arbitrary spline edge, of the endpoints of each line segment of said first edge;
means for determining second distances, relative to an aggregate length of the second arbitrary spline edge, of the endpoints of each line segment of said second edge;
means, for each line segment endpoint on the first arbitrary spline edge, for interpolating a point on the second arbitrary spline edge with the same relative distance along said second edge as the relative distance of said line segment endpoint along said first edge, thereby matching a point on said first edge with a point on said second edge and forming a corresponding matched point pair;
means, for each line segment endpoint on the second arbitrary spline edge, for interpolating a point on the first arbitrary spline edge with the same relative distance along said first edge as the relative distance of said line segment endpoint along said second edge, thereby matching a point on said second edge with a point on said first edge and forming a corresponding matched point pair; and
means for forming at least one polygon each comprising consecutive matched point pairs.

23. A method of constructing computer graphical objects, said method comprising the steps of:
providing a first plurality of spline-based edges;
defining each edge to have a corresponding color, said color along each edge being determined independently; and
creating a blend between pairs of said edges, said creating comprising the sub-steps of:
(i) forming a parametric equation for a color of each pixel within the area bounded at least by each of said pair of edges; and
(ii) solving said parametric equation to derive a color for each of said pixels,
wherein the number of said first plurality of edges is three, first and third ones of said edges have substantially the same color, a first of said pairs comprises a blend from the first of said edges, to a second of said edges, and a second of said pairs comprises a blend from the second of said edges to the third of said splines.

24. The method according to claim 23, wherein a second plurality of said edges have the spline color.

25. A method of constructing computer graphical objects, said method comprising the steps of:
providing a first plurality of spline-based edges;
defining each edge to have a corresponding color, said color along each edge being determined independently; and
creating a blend between pairs of said edges, comprising the sub-steps of:
(i) forming a parametric equation for a color of each pixel within the area bounded at least by each said pair of edges; and
(ii) solving said parametric equation to derive a color for each of said pixels, wherein a second plurality of said edges have the same color,
wherein the number of said second plurality of edges is four, a first and second of said edges have substantially the same color, a first of said pairs comprises a blend from the first of said edges to a second of said edges, a second of said pairs comprises a blend from the first of said edges to the second of said edges, and a third of said pairs comprises a blend from the second of said edges to a fourth of said edges.

26. The method according to claim 25, wherein at least one of said edges forms an internal area and said internal area is also defined to have the color of said at least one of said edges.

27. The method according to claim 25, wherein said corresponding color comprises an opacity.

28. The method according to claim 27, wherein said opacity include a blend of degree of opacity being substantially from the opacity of the color of the first member of the pair to the opacity of the color of the second member of said pair.

29. A method of constructing computer graphical objects, said method comprising the steps of:
providing a first plurality of spline-based edges;
defining each of said edges to have a corresponding color; and
creating a blend between pairs of said edges comprising the sub-steps of:
(i) vectorising each of said edges into corresponding linear line segments;
(ii) matching pairs of said linear line segments from each of said edges according to a distance along the corresponding line segments so as to form polygons whose edges comprise linear line segments having a defined color at their vertices; and
(iii) determining a color for each pixel of each said polygon from said defined color of said vertices,
wherein the number of said first plurality of edges is three, a first and second of said edges have substantially the same color, a first of said pairs includes a blend from the first of said edges to a third of said edges, and a second of said pairs includes a blend from a second of said edges to the third of said edges.

30. A method of constructing computer graphic objects said method comprising the steps of:
  providing a first plurality of spline-based edges;
  defining each of said edges to have a corresponding color; and
  creating a blend between pairs of said edges, comprising the sub-steps of:
    (i) vectorising each of said edges into corresponding linear line segments;
    (ii) matching pairs of said linear line segments from each of said colors according to a distance along the corresponding line segments so as to form polygons whose edges comprise linear line segments having a defined color at their vertices; and
    (iii) determining a color for each pixel of each said polygon from said defined color of said vertices, wherein a second plurality of said edges have the same color,
  wherein the number of said second plurality of edges is four, a first and second of said edges have substantially the same color, a first of said pairs includes a blend from the first of said edges to a third of said edges, a second of said pairs includes a blend from the first of said edges to the second of said edges, and a third of said pairs includes a blend from the second of said edges to a fourth of said edges.

31. A method of constructing computer graphical objects, said method comprising the steps of:
  providing a plurality of spline-based edges;
  defining each said edge to have a corresponding color; and
  creating a blend between pairs of said edges comprising the sub-steps of:
    (i) vectorising each of said edges into corresponding linear line segments;
    (ii) matching points along side linear line segments by matching equal relative distances along said edges, so as to form polygons whose edges include said linear line segments, or portions thereof, having a defined color at their vertices; and
    (iii) determining a color for each pixel of each said polygon from said defined color of said vertices.

32. The method according to claim 31, wherein said matching step further comprises matching pairs of linear line segments in accordance with their relative distance along the corresponding line segments for each of said edges, said line segments being subdivided to form said polygons.

33. The method according to claim 31, wherein said matching step further comprises matching pairs of linear line segments in accordance with their parametric distance along the corresponding line segments for each of said edges splines, said line segments being subdivided to form said polygons.

34. The method according to claim 31, wherein said step of determining a color for each pixel comprises dividing said polygon into regions of constant color and rendering each region of constant color.

35. The method according to claim 29, wherein a second plurality of said edges have the same color.

36. The method according to claim 31, wherein at least one of said edges forms an internal area and said internal area is also defined to have the color of said at least one of said edges.

37. The method according to claim 31, wherein said corresponding color comprises an opacity.

38. The method according to claim 37, wherein said opacity includes a blend of degree of opacity being substantially from the opacity of the color of the first member of the pair to the opacity of the color of the second member of said pair.

39. The method according to claim 31, wherein the equal relative distances along said are determined in accordance with a relative distance along the corresponding line segments for each edge.

40. The method according to claim 31, wherein the equal relative distances along said edges are determined in accordance with a parametric distance along each edge.

41. A method according to claim 31, wherein said step of matching linear line segments comprises the sub-steps of:
  (i) determining first distances, relative to an aggregate length of the first arbitrary spline edge, of the endpoints of each line segment of said first edge;
  (ii) determining second distances, relative to an aggregate length of the second arbitrary spline edge, of the endpoints of each line segments of said second edge; and
  (iii) for each line segment endpoint on the first arbitrary spline edge, interpolating a point on the second arbitrary spline edge with the same relative distance along said second edge as the relative distance of said line segment endpoint along said first edge, thereby matching a point on said first edge with a point on said second edge and forming a corresponding matched point pair;
  (iv) for each line segment end point on the second arbitrary spline edge, interpolating a point on the first arbitrary spline edge with the same relative distance along said first edge as the relative distance of said line segment endpoint along said second edge, thereby matching a point on said second edge with a point on said first edge and forming a corresponding matched point pair; and
  (v) forming at least one polygon each comprising consecutive matched point pairs.

42. An apparatus for constructing computer graphical objects comprising:
  generation means for providing a plurality of spline-based edges;
  color defining means for defining each of said edges to have a corresponding;
  blend creation means for creating a blend between pairs of said edges, wherein a blend is created being substantially from the color of a first member of said pair to the color of a second member of said pair, wherein said blend creation means further comprises:
    color determination means for determining a color along each of said edges, said color along each edge being determined independently of the color along other splines;
    parametric determination means for forming a parametric equation for a color of each pixel within the area bounded by said edges; and
    pixel color deriving means for solving said parametric equation to derive a color of each of said pixels.

43. The apparatus as claimed in claim 42, wherein the color defining means further includes an opacity defining means for defining the opacity associated with each of the corresponding color; and
  the blend creation means further creates a blend in the opacity associated with the corresponding color, wherein a blend in opacity being substantially from the opacity of the first edge member of the pair to the opacity associated with the second edge member of said pair.

44. The apparatus according to claim 42, wherein said color comprise an opacity.

45. An apparatus for constructing computer graphical objects comprising:

generation means for providing a plurality of spline-based edges;

color defining means for defining each of said edges to have a corresponding color;

blend creation means for creating a blend between pairs of said edges, wherein a blend is created being substantially from the color of a first member of said pair to the color of a second member of said pair wherein said blend creation means further comprises:

edge color determination means for determining a color along each of said edges;

edge vectorising means for vectorising each of said edges into corresponding linear line segments;

segment pair matching means for matching pairs of said linear line segments from each of said edges so as to form polygons having a defined color at their vertices; and pixel color determination means for determining a color for each pixel of each said polygon from said defined color of said vertices.

46. The apparatus according to claim 45, wherein said edge color, said color, and said defined color each comprise an opacity.

47. A computer readable medium incorporating a computer program product for creating a blend from a first arbitrary spline edge to a second arbitrary spline edge in a computer graphic image creation system, said computer program product comprising:

means for determining a color along each of said spline edges;

means for vectorising each of said spline edges into a series of corresponding linear line segments;

means for matching linear line segments, or portions thereof, from each of said spline edges by matching equal relative distances along said spline edges, so as to form polygons whose edges include said linear line segments, or portions thereof, having a defined color at their vertices; and means for determining a color for each pixel of each said polygon from said defined color of said vertices.

48. The computer readable medium according to claim 47, wherein said means for matching further matches pairs of points that lie on said linear line segments in accordance with their relative distance along the series of corresponding line segments for each of said spline edges, said line segments being subdivided to form said polygons.

49. The computer readable medium according to claim 47, wherein said means for matching further matches pairs of points that lie on said linear line segments in accordance with their parametric distance along the series of corresponding line segments for each of said spline edges, said line segments being subdivided to form said polygons.

50. The computer readable medium according to claim 47, wherein said means for determining a color for each pixel divides the polygon into regions of constant color and rendering each region of constant color.

51. The computer readable medium according to claim 47, wherein said color comprises an opacity and said defined color comprises a defined opacity.

52. The computer readable medium according to claim 47, wherein said means for matching is adapted to calculate a portion of the linear line segments corresponding to the first spline edge having a same relative distance as a distance along a corresponding linear line segment of the second spline edge and to match the linear line segments by matching the ends of the calculated portion corresponding to the first spline edge with the ends of the corresponding linear line segment of the second spline edge.

53. The computer readable medium according to claim 47, wherein a number of regions into which each polygon is divided is dependent upon a difference in color between the two spline edges.

54. The computer readable medium according to claim 47, wherein the equal relative distances along said spline edges are determined in accordance with a relative distance along the corresponding line segments for each spline edge.

55. The computer readable medium according to claim 47, wherein the equal relative distances along said spline edges are determined in accordance with a parametric distance along each spline edge.

56. A computer readable medium according to claim 47, wherein said means for matching linear line segments comprises:

means for determining first distances, relative to an aggregate length of the first arbitrary spline edge, of the endpoints of each line segment of said first edge;

means for determining second distances, relative to an aggregate length of the second arbitrary spline edge, of the endpoints of each line segment of said second edge; and means, for each line segment endpoint on the first arbitrary spline edge, for interpolating a point on the second arbitrary spline edge with the same relative distance along said second edge as the relative distance of said line segment endpoint along said first edge, thereby matching a point on said first edge with a point on said second edge and forming a corresponding matched point pair;

means, for each line segment endpoint on the second arbitrary spline edge, for interpolating a point on the first arbitrary spline edge with the same relative distance along said first edge as the relative distance of said line segment endpoint along said second edge, thereby matching a point on said second edge with a point on said first edge and forming a corresponding matched point pair; and means for forming at least one polygon comprising consecutive matched point pairs.

57. A computer readable medium incorporating a computer program product for constructing computer graphical objects, said computer program product comprising:

means for providing a first plurality of spline-based edges;

means for defining each of said edges to have a corresponding color; and means for creating a blend between pairs of said edges, said means for creating a blend comprising:

(i) means for vectorising each of said edges into a series of corresponding linear line segments;

(ii) means for matching points along said linear segments by matching equal relative distances along said edges, so as to form polygons whose edges comprise linear line segments, or portions thereof, having a defined color at their vertices; and (iii) means for determining a color for each pixel of each said polygon from said defined color of said vertices.

58. A computer readable medium according to claim 57, wherein said means for matching matches pairs of points that lie on said linear line segments in accordance with their relative distance along the series of corresponding line segments for each of said edges, said line segments being subdivided to form said polygons.

59. A computer readable medium according to claim 57, wherein said means for matching matches pairs of points that lie on said linear line segments in accordance with their parametric distance along the series of corresponding line segments for each of said edges, said line segments being subdivided to form said polygons.

60. A computer readable medium according to claim 57, wherein said step of determining a color for each pixel comprises dividing said polygon into regions of constant color and rendering each region of constant color.

61. A computer readable medium according to claim 57, wherein the number of said first plurality of edges is three, and a first and second of said edges have substantially the same color, and a first of said pairs comprises a blend from the first of said edges to a third of said edges, a second of said pairs comprises a blend from a second of said edges to said third of said edges.

62. A computer readable medium according to claim 57, wherein a second plurality of said edges have the same color.

63. A computer readable medium according to claim 62, wherein the number of said second plurality of edges is four, and a first and second of said edges have substantially the same color, and a first of said pairs comprises a blend from the first of said edges to a third of said edges, a second of said pairs comprises a blend from said first of said edges to said second of said edges, and a third of said pairs comprises a blend from said second of said edges to a fourth of said edges.

64. A computer readable medium according to claim 57, wherein at least one of said edges forms an internal area and said internal area is also defined to have the color of said at least one of said edges.

65. A computer readable medium according to claim 57, wherein said corresponding color comprises an opacity.

66. A computer readable medium according to claim 65, wherein said opacity includes a blend of degree of opacity being substantially from the opacity of the color of the first member of said pair to the opacity of the color of the second member of said pair.

67. The computer readable medium according to claim 57, wherein the equal relative distances along said edges are determined in accordance with a relative distance along the corresponding line segments for each edge.

68. The computer readable medium according to claim 57, wherein the equal relative distances along said edges are determined in accordance with a parametric distance along each edge.

69. A computer readable medium according to claim 57, wherein said means for matching linear line segments comprises:

means for determining first distances, relative to an aggregate length of the first arbitrary spline edge, of the endpoints of each line segment of said first edge;

means for determining second distances, relative to an aggregate length of the second arbitrary spline edge, of the endpoints of each line segment of said second edge;

means, for each line segment end point on the first arbitrary spline edge, for interpolating a point on the second arbitrary spline edge with the same relative distance along said second edge as the relative distance of said line segment endpoint along said first edge, thereby matching a point on said first edge with a point on said second edge and forming a corresponding second matched point pair;

means, for each line segment endpoint on the second arbitrary spline edge, for interpolating a point on the first arbitrary spline edge with the same relative distance along said first edge as the relative distance of said line segment endpoint along said second edge, thereby matching a point on said second edge with a point on said first edge and forming a corresponding second matched point pair; and means for forming at least one polygon each comprising consecutive matched point pairs.

70. A computer program product for controlling a method for creating a blend from a first arbitrary spline edge to a second arbitrary spline edge in a computer graphic image creation system, said method comprising:

a determining step for determining a color along each of said spline edges;

a vectorising step for vectorising each of said spline edges into corresponding linear line segments;

a matching step for matching linear line segments by matching equal relative distances along said spline edges, so as to form polygons whose edges comprise said linear line segments having a defined color at their vertices; and code for a determining step for determining a color for each pixel of each polygon from the defined color of the vertices.

71. The computer program product according to claim 70, wherein the equal relative distances along said spline edges are determined in accordance with a relative distance along the corresponding line segments for each edge.

72. The computer program product according to claim 70, wherein the equal relative distances along said spline edges are determined in accordance with a parametric distance along each spline edge.

73. A computer program product according to claim 70, wherein said matching step comprises:

determining first distances, relative to an aggregate length of the first arbitrary spline edge, of the endpoints of each line segment of said first edge;

determining second distances, relative to an aggregate length of the second arbitrary spline edge, of the endpoints of each line segment of said second edge;

for each line segment endpoint on the first arbitrary spline edge, interpolating a point on the second arbitrary spline edge with the same relative distance along said second edge as the relative distance of said line segment endpoint along said first edge, thereby matching a point on said first edge with a point on said second edge and forming a corresponding matched point pair;

for each line segment endpoint on the second arbitrary spline edge, interpolating a point on the first arbitrary spline edge with the same relative distance along said first edge as the relative distance of said line segment endpoint along said second edge, thereby matching a point on said second edge with a point on said first edge and forming a corresponding matched point pair; and forming at least one polygon each comprising consecutive matched points pairs.

* * * * *

UNITED STATES PATENT AND TRADEMARK OFFICE
CERTIFICATE OF CORRECTION

PATENT NO. : 6,339,433 B1
DATED : January 15, 2002
INVENTOR(S) : George Politis et al.

It is certified that error appears in the above-identified patent and that said Letters Patent is hereby corrected as shown below:

<u>Title page,</u>
Item [73], Assignees, "Canon Information Systems Research Australia PTY LTD, New South Whales (AU)" should be removed.

<u>Column 5,</u>
Line 6, "artefact" should read -- artifact --.

<u>Column 11,</u>
Line 25, "vectorising" should read -- vectorizing --.

<u>Column 12,</u>
Line 38, "vectorising" (both occurrences) should read -- vectorizing; -- and
Line 48, "vectorising" should read -- vectorizing --.

<u>Column 14,</u>
Line 15, "have" should read -- has --;
Line 45, "include" should read -- includes --; and
Line 56, "vectorising" should read -- vectorizing --.

<u>Column 15</u>
Line 12, "vectorising" should read -- vectorizing -- and
Lines 21 and 63, "have" should read -- has --.

<u>Column 16,</u>
Line 9, "said" should read -- said edges --;
Line 22, "segments" should read -- segment --;
Line 46, "a corresponding" should read -- corresponding color --; and
Line 64, "color" should read -- colors; --.

UNITED STATES PATENT AND TRADEMARK OFFICE
CERTIFICATE OF CORRECTION

PATENT NO. : 6,339,433 B1
DATED : January 15, 2002
INVENTOR(S) : George Politis et al.

It is certified that error appears in the above-identified patent and that said Letters Patent is hereby corrected as shown below:

Column 17,
Line 6, "comprise" should read -- comprises --;
Line 20, "vectorising" (both occurrences) should read -- vectorizing --; and
Line 39, "vectorsing" should read -- vecorizing --.

Signed and Sealed this

Twelfth Day of August, 2003

JAMES E. ROGAN
*Director of the United States Patent and Trademark Office*